US010718321B2

(12) United States Patent
Cheon (10) Patent No.: US 10,718,321 B2
(45) Date of Patent: Jul. 21, 2020

(54) MOTOR-INTEGRATED INTAKE APPARATUS

(71) Applicant: Jung Sik Cheon, Seoul (KR)

(72) Inventor: Jung Sik Cheon, Seoul (KR)

(73) Assignee: Jung Sik Cheon, Seoul (KR)

( * ) Notice: Subject to any disclaimer, the term of this patent is extended or adjusted under 35 U.S.C. 154(b) by 439 days.

(21) Appl. No.: 15/607,502

(22) Filed: May 28, 2017

(65) Prior Publication Data

US 2017/0354947 A1    Dec. 14, 2017

(30) Foreign Application Priority Data

Jun. 8, 2016    (KR) .......................... 10-2016-0070847

(51) Int. Cl.
*F04B 17/03*    (2006.01)
*H02K 99/00*    (2014.01)
(Continued)

(52) U.S. Cl.
CPC .......... *F04B 17/03* (2013.01); *F04D 13/0646* (2013.01); *H02K 99/10* (2016.11);
(Continued)

(58) Field of Classification Search
CPC .. A47L 5/02; A47L 5/12; A47L 9/2842; B01J 19/08; B01J 19/087; B03C 1/288; C02F 1/48; C02F 1/488; F04B 19/02; F04B 39/005; F04B 17/03; F04C 18/22; F04C 23/02; F04D 13/06; F04D 13/0646; F04D 17/03; F04D 17/04; F04D 35/04; F04D 35/045; H02K 1/2786; H02K 5/12; H02K 5/128; H02K 5/182; H02K 5/132;
(Continued)

(56) References Cited

U.S. PATENT DOCUMENTS 1,351,906 A * 9/1920 Heeter ................ F04B 53/1037
  417/552
4,163,726 A * 8/1979 Wilson ...................... F16K 3/03
  210/512.1
(Continued)

FOREIGN PATENT DOCUMENTS

CN    101749241 A    6/2010
JP      3967116 B2    1/2003
(Continued)

*Primary Examiner* — Patrick Hamo
*Assistant Examiner* — Joseph S. Herrmann
(74) *Attorney, Agent, or Firm* — Invention Mine LLC (57) ABSTRACT

An exemplary embodiment of the present disclosure relates to a motor-integrated intake apparatus, and the motor-integrated intake apparatus includes: a flow path which is formed in an annular shape in a circular housing; an inlet unit which is installed at one side of the housing and guides a flow of a fluid into the flow path; a discharge unit which is installed at the other side of the housing and guides a discharge of the fluid which is introduced into the inlet unit and passes through the flow path; a piston unit which is made of a magnetic material and compresses the fluid, which is introduced through the inlet unit, while rotating along the flow path; and a coil unit which is installed on the housing and provides rotational power to the piston unit by forming a magnetic field.

10 Claims, 6 Drawing Sheets

(51) Int. Cl.
*F04D 13/06* (2006.01)
*F16K 3/03* (2006.01)
*F16K 31/04* (2006.01)

(52) U.S. Cl.
CPC ............... *F04D 13/06* (2013.01); *F16K 3/03* (2013.01); *F16K 31/04* (2013.01)

(58) Field of Classification Search
CPC .................................................. H02K 99/10; F16K 3/03; F16K 3/186; F16K 31/041; F16K 31/524
See application file for complete search history.

(56) References Cited

U.S. PATENT DOCUMENTS

| | | | | |
|---|---|---|---|---|
| 4,381,181 A | * | 4/1983 | Clegg | F04D 7/00 310/14 |
| 4,385,498 A | * | 5/1983 | Fawcett | F01C 1/063 60/649 |
| 4,965,864 A | * | 10/1990 | Roth | H02K 41/031 310/12.19 |
| 7,474,020 B2 | * | 1/2009 | Pal | H02K 7/1884 310/14 |
| 10,087,757 B2 | * | 10/2018 | Cheon | F01C 1/00 |
| 2010/0268333 A1 | * | 10/2010 | Gohean | A61M 1/1081 623/3.14 |
| 2017/0292616 A1 | * | 10/2017 | Moens | F16K 3/03 |

FOREIGN PATENT DOCUMENTS

| | | |
|---|---|---|
| JP | 2003013850 A | 1/2003 |
| KR | 20100125259 A | 11/2010 |
| KR | 101587413 B1 | 4/2015 |
| KR | 20150044593 A | 4/2015 |
| KR | 101553783 B1 | 9/2015 |
| WO | 2015163661 | 10/2015 |

\* cited by examiner

MOTOR-INTEGRATED INTAKE APPARATUS

CROSS-REFERENCE TO RELATED APPLICATIONS

This application claims benefit and priority to Korean Patent Application No. 10-2016-0070847, filed on Jun. 8, 2016, with the Korean Intellectual Property Office, the disclosure of which is incorporated herein in its entirety by reference.

TECHNICAL FIELD

Exemplary embodiments of the present disclosure relate to a motor-integrated intake apparatus, and more particularly, to a motor-integrated intake apparatus in which a piston unit having a magnetic material compresses a fluid while moving along a flow path in which a magnetic field is formed.

BACKGROUND

In general, an intake apparatus draws and compresses a fluid. In addition, the intake apparatus draws and compresses a fluid by using power provided by a motor. The compressed fluid may be supplied to another separate apparatus or discharged back to the outside after foreign substances are removed from the drawn fluid.

That is, the intake apparatus draws, compresses, and discharges a fluid by using the provided power.

However, the intake apparatus in the related art such as a compressor is coupled to an external power generator such as the motor, and as a result, there is a problem in that a weight of the intake apparatus is heavy and thus it is difficult to carry the intake apparatus. Further, the compressor in the related art has a problem in that a fluid leaks from a connecting portion where a compressor main body and the external power generator are coupled to each other. Therefore, there is a problem in that when connecting a component for watertightness or airtightness to the connecting portion, other separate processing need to be performed in order to prevent the leakage.

SUMMARY

An exemplary embodiment of the present disclosure has been made in an effort to provide a motor-integrated intake apparatus which may be manufactured compactly and does not require a separate motor.

An exemplary embodiment of the present disclosure provides a motor-integrated intake apparatus including: a flow path which is formed in an annular shape in a circular housing; an inlet unit which is installed at one side of the housing and guides a flow of a fluid into the flow path; a discharge unit which is installed at the other side of the housing and guides a discharge of the fluid which is introduced into the inlet unit and passes through the flow path; a piston unit which is made of a magnetic material and compresses the fluid, which is introduced through the inlet unit, while rotating along the flow path; and a coil unit which is installed on the housing and provides rotational power to the piston unit by forming a magnetic field.

The motor-integrated intake apparatus may further include an opening and closing unit which is installed in the housing between the inlet unit and the discharge unit and selectively opens and closes the flow path by being pressed by the piston unit.

One end portion of the piston unit, which presses the opening and closing unit, may be formed in a conical shape.

The coil unit may include a plurality of coil members which is installed to surround different regions of the flow path.

The plurality of coil members may include: a first coil member which is installed at one side of the inlet unit so as to surround one region of the flow path; a second coil member which is installed to be spaced apart from the first coil member and surround another region of the flow path; a third coil member which is installed at the other side of the discharge unit so as to surround still another region of the flow path; and a fourth coil member which is installed between the second coil member and the third coil member so as to surround yet another region of the flow path.

The motor-integrated intake apparatus may further include: a detecting unit which detects a position of the piston unit; and a control unit which selectively forms a magnetic field in one or more coil members among the plurality of coil members in accordance with a position of the piston unit which is detected by the detecting unit.

The detecting unit may include: a first detecting member which is installed between the first coil member and the second coil member; a second detecting member which is installed between the second coil member and the fourth coil member; a third detecting member which is installed between the fourth coil member and the third coil member; and a fourth detecting member which is installed between the third coil member and the first coil member.

The opening and closing unit may include: three or more opening and closing members which are rotatably supported on the housing so as to be spaced apart from one another at one side of each of the three or more opening and closing members and come into contact with one another at the other side of each of the three or more opening and closing members; and an elastic member which provides elastic force so that the three or more opening and closing members come into contact with one another at the other side of each of the three or more opening and closing members.

One end portion of the other side of each of the three or more opening and closing members may be formed such that the three or more opening and closing members are spaced apart from one another, and the other end portion of each of the three or more opening and closing members may be formed such that the three or more opening and closing members come into surface-to-surface contact with one another.

The housing of the motor-integrated intake apparatus may further include an installation region which is formed as one region between the inlet unit and the discharge unit protrudes outward, and the three or more opening and closing members may be installed in the installation region.

The piston unit of the motor-integrated intake apparatus may include: a piston body which is supported to be rotatable along the flow path and has a plurality of magnetic members; a first piston which is made of a magnetic material and installed on the piston body so as to move along the flow path; and a second piston which is made of a magnetic material and moves along the flow path while having a phase difference of 180 degrees (°) with the first piston.

The motor-integrated intake apparatus may further include an opening and closing unit which is installed in the housing between the inlet unit and the discharge unit and selectively opens and closes the flow path by being pressed by the first piston or the second piston.

The coil unit may include a plurality of coil members which is installed to form a magnetic field in different regions of the flow path.

The motor-integrated intake apparatus may further include: a hollow portion which is formed at a central portion of the housing; and a radial support unit which includes a first support member which is installed in a direction intersecting the hollow portion, a second support member which is installed in the hollow portion in a direction intersecting the first support member, and a third support member which is installed in the hollow portion in a direction intersecting the first support member and the second support member.

The plurality of coil members may include: a first coil member which is installed on the first support member; a second coil member which is installed on the second support member; and a third coil member which is installed on the third support member.

The motor-integrated intake apparatus may further include: a detecting unit which detects a position of the first piston or the second piston; and a control unit which selectively forms a magnetic field in one or more coil members among the plurality of coil members in accordance with a position of the first piston or the second piston which is detected by the detecting unit.

The opening and closing unit may include: a plurality of opening and closing members which is installed in the housing between the inlet unit and the discharge unit; and a plurality of elastic members which is installed between the plurality of opening and closing members and the flow path, and supports the plurality of opening and closing members, respectively.

The housing may further include an installation region which is formed as one region between the inlet unit and the discharge unit protrudes outward, and the opening and closing unit may be installed in the installation region.

According to the exemplary embodiments of the present disclosure, the motor-integrated intake apparatus is compactly manufactured by the piston unit having a magnetic material and the coil unit without a separate external motor, thereby drawing a fluid effectively and without leakage.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Exemplary embodiments of the present disclosure illustrate ideal exemplary embodiments of the present disclosure in detail. As a result, various modifications of the drawings are expected. Therefore, the exemplary embodiments are not limited to specific forms in regions illustrated in the drawings, and for example, include modifications of forms by the manufacture.

Hereinafter, a motor-integrated intake apparatus 101 according to a first exemplary embodiment of the present disclosure will be described with reference to FIGS. 1 to 3.

Figure 1:
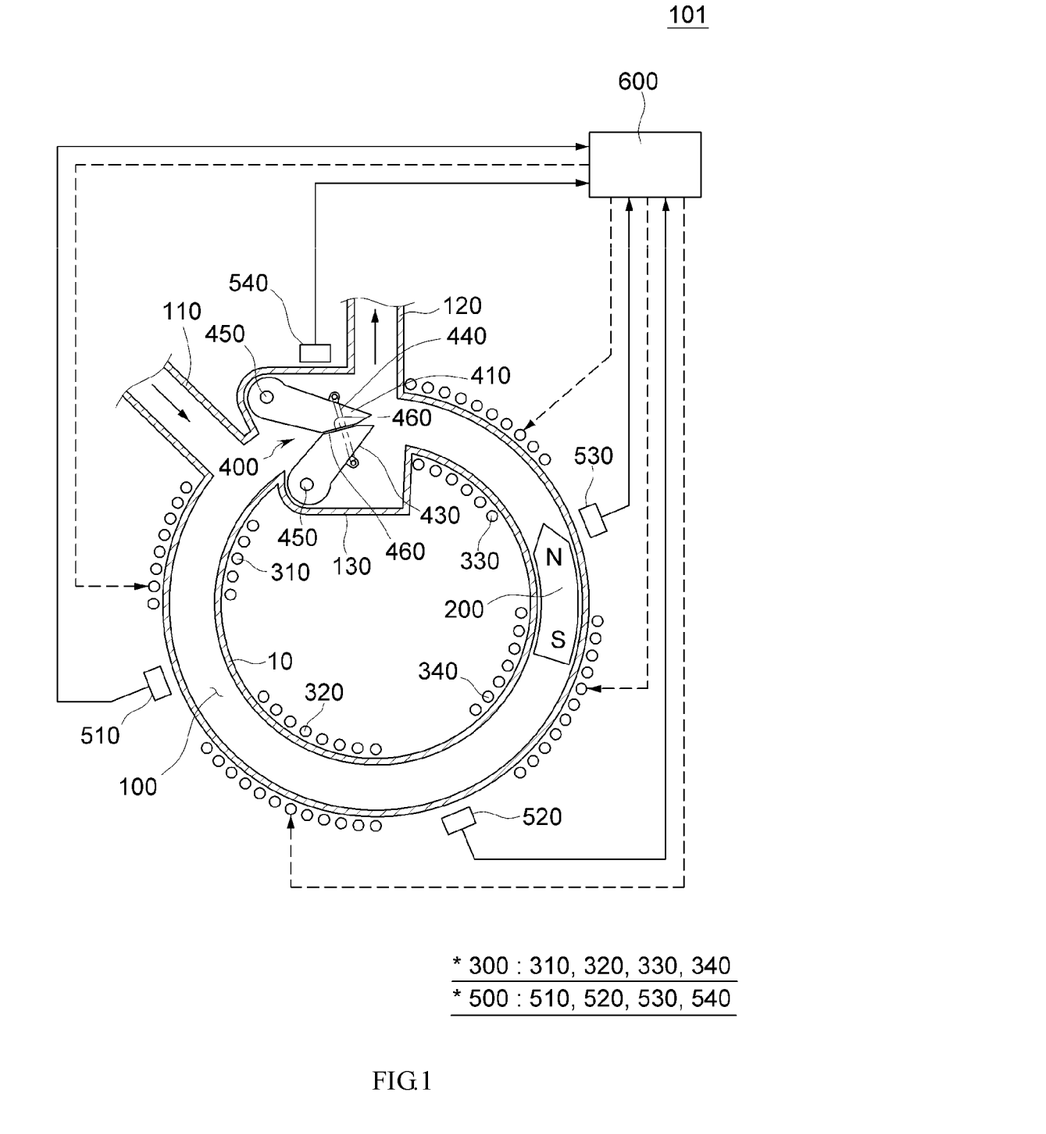
FIG. 1 is a configuration view illustrating a motor-integrated intake apparatus according to a first exemplary embodiment of the present disclosure.

As illustrated in FIG. 1, the motor-integrated intake apparatus 101 according to the first exemplary embodiment of the present disclosure includes a flow path 100 which is formed in a circular housing 10, an inlet unit 110, a discharge unit 120, a piston unit 200, and a coil unit 300.

The flow path 100 is formed in an annular shape in the circular housing 10. Specifically, the flow path 100 is formed in a ring shape along an interior of the circular housing 10.

The inlet unit 110 is installed at one side of the housing 10. In addition, the inlet unit 110 is installed at one side of the housing 10 and guides a fluid to introduce the fluid into the flow path 100. Specifically, a fluid outside the housing 10 may be introduced into the flow path 100 through the inlet unit 110 that communicates with the flow path 100.

The discharge unit 120 is installed at the other side of the housing 10. In addition, the discharge unit 120 is installed at the other side of the housing 10 and guides the fluid passing through the flow path 100 so that the fluid is discharged to the outside of the housing 10. Specifically, the fluid passing through the flow path 100 in the housing 10 may be discharged to the outside of the housing 10 through the discharge unit 120 that communicates with the flow path 100.

The piston unit 200 is installed in the flow path 100 and moves along the annular flow path 100. In addition, the piston unit 200 is made of a magnetic material. That is, one end portion and the other end portion of the piston unit 200 have different poles. Therefore, the piston unit 200 made of a magnetic material moves along the annular flow path 100 and may compress the fluid introduced into the flow path 100 through the inlet unit 110.

Specifically, one end portion of the piston unit 200 according to the first exemplary embodiment of the present disclosure may be formed in a conical shape, and the other end portion of the piston unit 200 may be formed in a cylindrical shape. That is, one end portion of the piston unit 200, which has a cylindrical shape, may be formed to have a conical shape.

The coil unit 300 is installed on the housing 10 so as to surround a part of the flow path 100. The coil unit 300 may be installed on the housing 10 and wound to surround an outer circumference of the flow path 100. In addition, a magnetic field is formed by electric power supplied to the coil unit 300. Therefore, the piston unit 200 may be moved along the flow path 100 by magnetic force generated by magnetic fields at one end portion and the other end portion of the piston unit 200 and a magnetic field of the coil unit 300 which are generated by the coil unit 300, in which the magnetic field is formed, and the piston unit 200 having a magnetic material.

That is, the piston unit 200 may be moved along the annular flow path 100 by rotational power provided by the coil unit 300.

Figure 2:
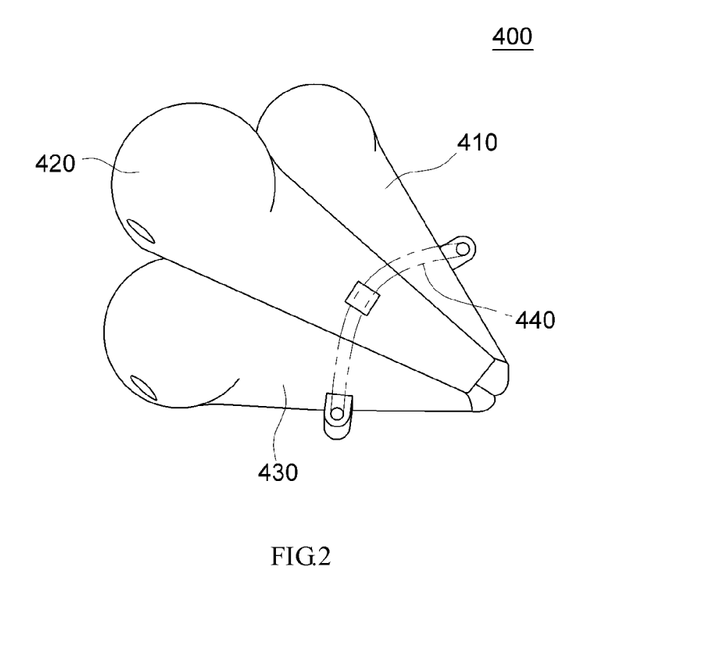
FIG. 2 is a view illustrating an opening and closing unit in FIG. 1.

As illustrated in FIGS. 1 and 2, the motor-integrated intake apparatus 101 according to the first exemplary embodiment of the present disclosure may further include an opening and closing unit 400.

The opening and closing unit 400 may be installed inside the housing 10 between the inlet unit 110 and the discharge unit 120. In addition, the opening and closing unit 400 may selectively open and close the flow path 100 between the inlet unit 110 and the discharge unit 120 in accordance with pressing force of the piston unit 200. Specifically, the opening and closing unit 400 may open the flow path 100 by coming into contact with the piston unit 200, and may close the flow path 100 by being separated from the piston unit 200.

Therefore, the opening and closing unit 400 may selectively open and close the flow path 100 by means of the piston unit 200.

The coil unit 300 of the motor-integrated intake apparatus 101 according to the first exemplary embodiment of the present disclosure may include a plurality of coil members 310, 320, 330, and 340.

The plurality of coil members 310, 320, 330, and 340 may be installed to surround different regions of the flow path 100. That is, the respective coil members 310, 320, 330, and 340 may be disposed to be spaced apart from each other along the flow path 100 and installed to surround different regions of the outer circumference of the flow path 100.

Therefore, the piston unit 200 may be effectively moved in accordance with directions of the magnetic fields formed in the respective coil members 310, 320, 330, and 340 disposed in different regions of the outer circumference of the flow path 100.

Otherwise, the plurality of coil members 310, 320, 330, and 340 according to the first exemplary embodiment of the present disclosure may include a first coil member 310, a second coil member 320, a third coil member 330, and a fourth coil member 340.

The first coil member 310 may be installed at one side of the inlet unit 110 so as to surround one region of the flow path 100. That is, the first coil member 310 may be installed to surround one region of the outer circumference of the flow path 100 adjacent to the inlet unit 110.

The second coil member 320 may be installed to be spaced apart from the first coil member 310 and surround another region of the flow path 100. That is, the second coil member 320 may be installed to be spaced apart from the first coil member 310 and surround another region of the outer circumference of the flow path 100.

The third coil member 330 may be installed at the other side of the discharge unit 120 so as to surround still another region of the flow path 100. That is, the third coil member 330 may be installed to surround still another region of the outer circumference of the flow path 100 adjacent to the discharge unit 120.

The fourth coil member 340 may be installed to surround yet another region of the flow path 100 between the second coil member 320 and the third coil member 330. That is, the fourth coil member 340 may be disposed between the second coil member 320 and the third coil member 330 so as to be spaced apart from the second coil member 320 and the third coil member 330 and installed to surround yet another region of the outer circumference of the flow path 100.

Therefore, the first coil member 310, the second coil member 320, the third coil member 330, and the fourth coil member 340 may be disposed to be spaced apart from one another and installed to surround different regions of the outer circumference of the flow path 100.

The motor-integrated intake apparatus 101 according to the first exemplary embodiment of the present disclosure may further include a detecting unit 500 and a control unit 600.

The detecting unit 500 may detect a position of the piston unit 200 that moves along the flow path 100. That is, the detecting unit 500 is installed on the housing 10 and may detect the current position of the piston unit 200. Specifically, the detecting unit 500 may detect the position of the piston unit 200, which is made of a magnetic material, inside the flow path 100. As an example, the detecting unit 500 may be a Hall element.

The control unit 600 may receive position information of the piston unit 200 which is detected by the detecting unit 500. In addition, based on the position information of the piston unit 200 which is provided from the detecting unit 500, the control unit 600 may selectively form a magnetic field in one or more coil members among the plurality of coil members 310, 320, 330, and 340. That is, based on the current position of the piston unit 200, the control unit 600 may selectively control a direction of a magnetic field formed in one or more coil members among the plurality of coil members 310, 320, 330, and 340 which is required to move the piston unit 200.

As an example, in a case in which one end portion of the piston unit 200 has the N-pole and the other end portion of the piston unit 200 has the S-pole, the control unit 600 forms a magnetic field, which has attractive force to the N-pole, in the coil member adjacent to the N-pole of the piston unit 200, and forms a magnetic field, which has repulsive force to the S-pole, in the coil member adjacent to the S-pole, such that the piston unit 200 may move along the flow path 100.

The detecting unit 500 of the motor-integrated intake apparatus 101 according to the first exemplary embodiment of the present disclosure may include a first detecting member 510, a second detecting member 520, a third detecting member 530, and a fourth detecting member 540.

The first detecting member 510 may be installed on the housing 10 between the first coil member 310 and the second coil member 320. That is, the first detecting member 510 detects a position of the piston unit 200 positioned between the first coil member 310 and the second coil member 320, and may transmit information about the position of the piston unit 200 to the control unit 600.

The second detecting member 520 may be installed on the housing 10 between the second coil member 320 and the fourth coil member 340. That is, the second detecting member 520 detects a position of the piston unit 200 positioned between the second coil member 320 and the fourth coil member 340, and may transmit information about the position of the piston unit 200 to the control unit 600.

The third detecting member 530 may be installed on the housing 10 between the fourth coil member 340 and the third coil member 330. That is, the third detecting member 530 detects a position of the piston unit 200 positioned between the fourth coil member 340 and the third coil member 330, and may transmit information about the position of the piston unit 200 to the control unit 600.

The fourth detecting member 540 may be installed on the housing 10 between the third coil member 330 and the first coil member 310. That is, the fourth detecting member 540 detects a position of the piston unit 200 positioned between the third coil member 330 and the first coil member 310, and may transmit information about the position of the piston unit 200 to the control unit 600.

Therefore, since the detecting unit 500 includes the first detecting member 510, the second detecting member 520, the third detecting member 530, and the fourth detecting member 540 which are installed at different positions, the detecting unit 500 may effectively detect a position of the piston unit 200 positioned in the flow path 100. In addition, based on the position information of the piston unit 200, the control unit 600 may effectively control the directions of the magnetic fields formed in the plurality of coil members 310, 320, 330, and 340 including the first coil member 310, the second coil member 320, the third coil member 330, and the fourth coil member 340.

The opening and closing unit 400 according to the first exemplary embodiment of the present disclosure may include three or more opening and closing members 410, 420, and 430 and an elastic member 440.

The three or more opening and closing members 410, 420, and 430 may be supported in the housing 10 so as to be spaced apart from one another so that one side of each of the opening and closing members 410, 420, and 430 is rotatable. Specifically, one side of each of the opening and closing members 410, 420, and 430 may be coupled to the housing 10 by means of a rotation pin 450. That is, one side of each of the opening and closing members 410, 420, and 430 may be rotatably supported on the housing 10 by means of the rotation pin 450.

The three or more opening and closing members 410, 420, and 430 may come into contact with one another at the other side of each of the opening and closing members 410, 420, and 430. Specifically, the opening and closing members 410, 420, and 430 are installed to be spaced apart from one another at one side of each of the opening and closing members 410, 420, and 430, and the opening and closing members 410, 420, and 430 may come into contact with one another at the other side of each of the opening and closing members 410, 420, and 430.

The elastic member 440 may provide elastic force so that the three or more opening and closing members 410, 420, and 430 may come into contact with one another at the other side of each of the opening and closing members 410, 420, and 430. Specifically, the elastic member 440 connects and supports an outer circumferential surface of the other side of each of the opening and closing members 410, 420, and 430, and may provide elastic force so that the opening and closing members 410, 420, and 430 may come into contact with one another at the other side of each of the opening and closing members 410, 420, and 430.

Therefore, when pressing force applied by the piston unit 200 is eliminated, the three or more opening and closing members 410, 420, and 430 are effectively brought into contact with one another by the elastic member 440, thereby closing the flow path 100.

In the motor-integrated intake apparatus 101 according to the first exemplary embodiment of the present disclosure, the three or more opening and closing members 410, 420, and 430 may be formed so that the opening and closing members 410, 420, and 430 are spaced apart from one another at one end portion of the other side of each of the opening and closing members 410, 420, and 430, and the opening and closing members 410, 420, and 430 come into surface-to-surface contact with one another at the other end portion of the other side of each of the opening and closing members 410, 420, and 430.

One end portion of the other side of each of the opening and closing members 410, 420, and 430 is formed to have an acute angle, such that the three or more opening and closing members 410, 420, and 430 may be spaced apart from one another and may not come into contact with one another when closing the flow path 100. Therefore, the opening and closing unit 400 may effectively open the flow path 100 when the conical one end portion of the piston unit 200 comes into contact with the three or more opening and closing members 410, 420, and 430. That is, the flow path 100 may be opened as the three or more opening and closing members 410, 420, and 430 are moved in a direction away from one another by a wedge effect of the conical one end portion of the piston unit 200 which presses the three or more opening and closing members 410, 420, and 430. In addition, the other end portion of the other side of each of the opening and closing members 410, 420, and 430 may be formed such that the three or more opening and closing members 410, 420, and 430 come into surface-to-surface contact with one another when closing the flow path 100.

Figure 3:
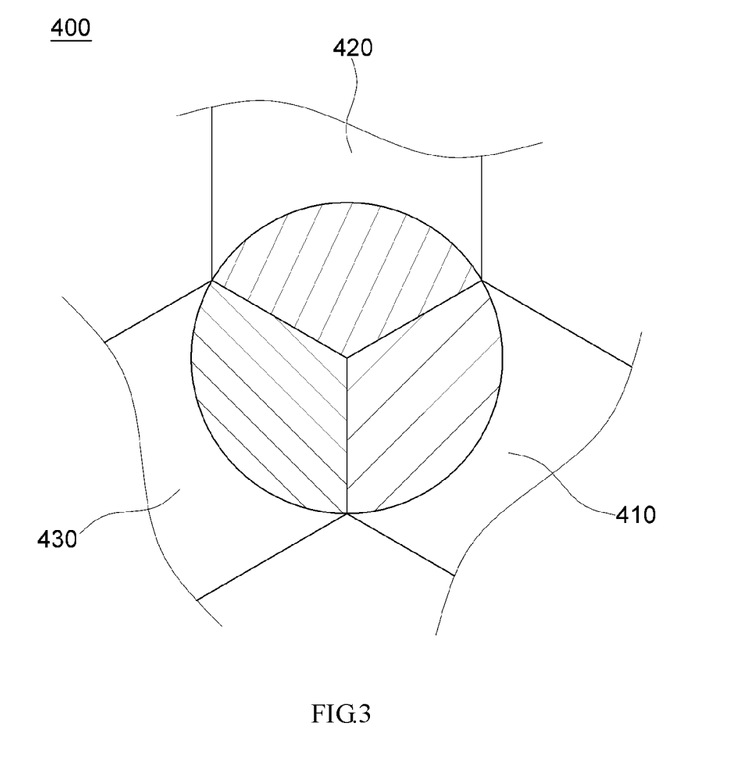
FIG. 3 is a view illustrating a cross section of the opening and closing unit in FIG. 1.

Specifically, as illustrated in FIG. 3, a wedge-shaped contact surface 460 may be formed at the other end portion of the other side of each of the opening and closing members 410, 420, and 430. When the three or more opening and closing members 410, 420, and 430 close the flow path 100, the contact surfaces 460 of the three or more opening and closing members 410, 420, and 430 come into surface-to-surface contact with one another, thereby effectively closing the flow path 100.

The housing 10 of the motor-integrated intake apparatus 101 according to the first exemplary embodiment of the present disclosure may further include an installation region 130.

The installation region 130 may be formed as one region between the inlet unit 110 and the discharge unit 120 protrudes outward. Specifically, the installation region 130 may be formed as one region between the inlet unit 110 and the discharge unit 120 in the flow path 100 formed in the housing 10 is expanded in diameter compared to the other regions of the flow path 100.

The three or more opening and closing members 410, 420, and 430 according to the first exemplary embodiment of the present disclosure may be installed in the installation region 130.

One side of each of the three or more opening and closing members 410, 420, and 430 may be rotatably supported by being coupled to the rotation pin 450 in the installation region 130. In addition, the three or more opening and closing members 410, 420, and 430 come into contact with the conical one end portion of the piston unit 200 in the installation region 130, such that the opening and closing members 410, 420, and 430 may be moved in a direction away from one another at the other side of each of the opening and closing members 410, 420, and 430, thereby opening the flow path 100. Further, when the piston unit 200 is released from the three or more opening and closing members 410, 420, and 430, the three or more opening and closing members 410, 420, and 430 may be moved toward one another at the other side of each of the opening and closing members 410, 420, and 430 by the elastic member 440 and pressing force of the fluid between the installation region 130 and outer circumferential surfaces of the three or more opening and closing members 410, 420, and 430, thereby closing the flow path 100.

Specifically, the three or more opening and closing members 410, 420, and 430 may include a first opening and closing member 410, a second opening and closing member 420, and a third opening and closing member 430. The first opening and closing member 410, the second opening and closing member 420, and the third opening and closing member 430 may open and close the flow path 100 in the installation region 130 by 120 degrees for each opening and closing member.

That is, when the three or more opening and closing members 410, 420, and 430 close the flow path 100, pressing force of the fluid between the installation region 130 and the outer circumferential surfaces of the three or more opening and closing members 410, 420, and 430 may assist the three or more opening and closing members 410, 420, and 430 in effectively closing the flow path 100.

Hereinafter, an operating process of the motor-integrated intake apparatus 101 according to the first exemplary embodiment of the present disclosure will be described with reference to FIGS. 1 to 3.

The control unit 600 detects a position of the piston unit 200 in the annular flow path 100 by means of the detecting unit 500. Specifically, the control unit 600 detects the current position of the piston unit 200 by means of the first detecting member 510, the second detecting member 520, the third detecting member 530, and the fourth detecting member 540.

Based on information about the current position of the piston unit 200, which is detected by the detecting unit 500, the control unit 600 supplies electric power to one or more coil members among the first coil member 310, the second coil member 320, the third coil member 330, and the fourth coil member 340 so as to create a magnetic field.

As an example, in a case in which the current position of the piston unit 200 is detected by the third detecting member 530, the control unit 600 may form a magnetic field, which may apply attractive force to one end portion (N-pole) of the piston unit 200, in the third coil member 330, and may form a magnetic field, which may apply repulsive force to the other end portion (S-pole) of the piston unit 200, in the fourth coil member 340. In this case, the piston unit 200 having magnetism moves along the flow path 100 in a direction adjacent to the third coil member 330 by magnetic force of the third coil member 330 and the fourth coil member 340 in which the magnetic fields are formed. In this case, the fluid, which is previously introduced into the flow path 100 through the inlet unit 110, may be compressed in the flow path 100 between one end portion of the piston unit 200 and the opening and closing unit 400.

When the piston unit 200 becomes adjacent to the discharge unit 120 as the piston unit 200 moves, the compressed fluid may be discharged to the outside of the housing 10 through the discharge unit 120.

The control unit 600 continuously receives information about the current position of the piston unit 200 from the first detecting member 510, the second detecting member 520, the third detecting member 530, and the fourth detecting member 540 when the piston unit 200 moves, and the control unit 600 may supply electric power so that a magnetic field is formed in one or more coil members among the first coil member 310, the second coil member 320, the third coil member 330, and the fourth coil member 340 so that the piston unit 200 may move along the flow path 100.

When the conical one end portion of the piston unit 200 comes into contact with the other side of the opening and closing unit 400 as the piston unit 200 moves, the three or more opening and closing members 410, 420, and 430 of the opening and closing unit 400 are spread, thereby opening the flow path 100. Specifically, one side of each of the three or more opening and closing members 410, 420, and 430 is coupled in the installation region 130 and rotatably supported by means of the rotation pin 450, and the other side of each of the three or more opening and closing members 410, 420, and 430 comes into contact with the piston unit 200, such that the opening and closing members 410, 420, and 430 may be spread in a direction away from one another.

When the piston unit 200 is separated from the three or more opening and closing members 410, 420, and 430, the three or more opening and closing members 410, 420, and 430 are retracted in a direction close to one another at the other side of each of the opening and closing members 410, 420, and 430 by elastic force provided by the elastic member 440 and fluid pressure between the installation region 130 and the outer circumferential surfaces of the three or more opening and closing members 410, 420, and 430, and the opening and closing members 410, 420, and 430 come into surface-to-surface contact with one another at the other end portion of each of the opening and closing members 410, 420, and 430, thereby effectively maintaining the closed state of the flow path 100.

When the piston unit 200 is separated from the three or more opening and closing members 410, 420, and 430, the piston unit 200 moves along the annular flow path 100, and thus the fluid introduced from the inlet unit 110 may be compressed in the flow path 100 between one end portion of the piston unit 200 and the opening and closing unit 400.

With the aforementioned configuration, the motor-integrated intake apparatus 101 according to the first exemplary embodiment of the present disclosure may effectively compress the fluid by the coil unit 300 that forms a magnetic field with the piston unit 200 having a magnetic material. Specifically, the fluid may be compressed compactly by the piston unit 200 installed in the flow path 100 in the housing 10 and the coil unit 300 installed on the housing 10. That is, the motor-integrated intake apparatus 101 may be manufactured to be portable without requiring a separate driving power generation apparatus such as an external motor for moving the piston unit 200.

As an example, the motor-integrated intake apparatus 101 according to the first exemplary embodiment of the present disclosure may effectively draw a fluid when being applied to an apparatus to be conveyed such as a cleaner, and as a result, it is possible to effectively supply electric power to the coil unit 300 through an electric power supply unit without separate driving power such as an external motor.

Hereinafter, a motor-integrated intake apparatus 102 according to a second exemplary embodiment of the present disclosure will be described with reference to FIGS. 4 to 6.

Figure 4:
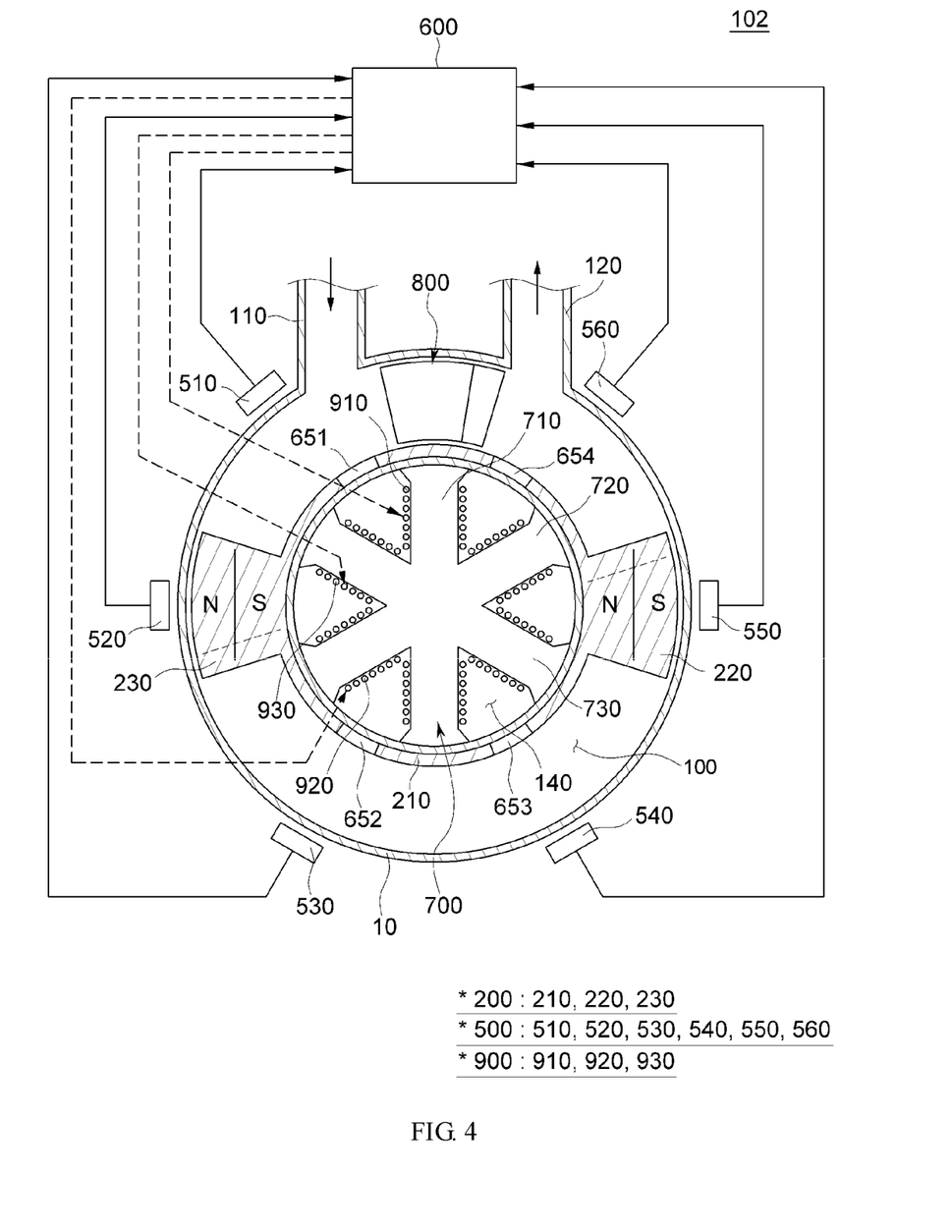
FIG. 4 is a configuration view illustrating a motor-integrated intake apparatus according to a second exemplary embodiment of the present disclosure.

As illustrated in FIG. 4, the motor-integrated intake apparatus 102 according to the second exemplary embodiment of the present disclosure includes a flow path 100 which is formed in a circular housing 10, an inlet unit 110, a discharge unit 120, a piston unit 200, and a coil unit 900.

The flow path 100 is formed in an annular shape in the circular housing 10. Specifically, the flow path 100 is formed in a ring shape along an interior of the circular housing 10.

The inlet unit 110 is installed at one side of the housing 10. In addition, the inlet unit 110 is installed at one side of the housing 10 and guides a fluid to introduce the fluid into the flow path 100. Specifically, a fluid outside the housing 10 may be introduced into the flow path 100 through the inlet unit 110 that communicates with the flow path 100.

The discharge unit 120 is installed at the other side of the housing 10. In addition, the discharge unit 120 is installed at the other side of the housing 10 and guides the fluid passing through the flow path 100 so that the fluid is discharged to the outside of the housing 10. Specifically, the fluid passing through the flow path 100 in the housing 10 may be discharged to the outside of the housing 10 through the discharge unit 120 that communicates with the flow path 100.

The piston unit 200 includes a piston body 210, a first piston 220, and a second piston 230.

The piston body 210 may be formed in an annular shape so as to be rotated along an inner wall of the annular flow path 100.

The first piston 220 has a magnetic material. In addition, the first piston 220 is formed to protrude at one side of the annular piston body 210. Further, the first piston 220 moves along the flow path 100 along with the annular piston body 210 when the annular piston body 210 rotates.

Similar to the first piston 220, the second piston 230 is formed to have a magnetic material. In addition, the second piston 230 is formed to protrude at the other side of the annular piston body 210 so as to have a phase difference of 180 degrees with the first piston 220.

Specifically, one end portion of each of the first and second pistons 220 and 230 may be formed in a wedge shape, and the other end portion of each of the first and second pistons 220 and 230 may be formed in a cylindrical shape. That is, the first piston 220 and the second piston 230 may have a structure in which cylindrical one end portion thereof is formed in a wedge shape.

A plurality of magnetic members 651, 652, 653, and 654 may be further installed in the piston body 210. The plurality of magnetic members 651, 652, 653, and 654 may be installed to be inserted into an annular circumferential surface of the piston body 210 so as to be spaced apart from one another. As an example, the plurality of magnetic members 651, 652, 653, and 654 may include a first magnetic member 651, a second magnetic member 652, a third magnetic member 653, and a fourth magnetic member 654.

The first magnetic member 651 and the second magnetic member 652 may be installed in the piston body 210 so as to be spaced apart from one another based on the second piston 230, and the third magnetic member 653 and the fourth magnetic member 654 may be installed in the piston body 210 so as to be spaced apart from one another based on the first piston 220.

The coil unit 900 is installed in the housing 10 and provides power so that a magnetic field is formed in the flow path 100 and the piston unit 200 rotates along the flow path 100. Specifically, the first and second pistons 220 and 230 may be moved along the flow path 100 by magnetic force generated by magnetic fields of the first and second pistons 220 and 230 and a magnetic field of the coil unit 900 which are generated by the coil unit 900, which forms the magnetic field, and the first and second pistons 220 and 230 having a magnetic material.

That is, the first and second pistons 220 and 230 may be moved along the annular flow path 100 by rotational power provided by the coil unit 900.

Since the plurality of magnetic members 651, 652, 653, and 654 is installed in the piston body 210, the piston unit 200 may be more effectively moved along the annular flow path 100 by rotational power provided by the coil unit 900.

Figure 5:
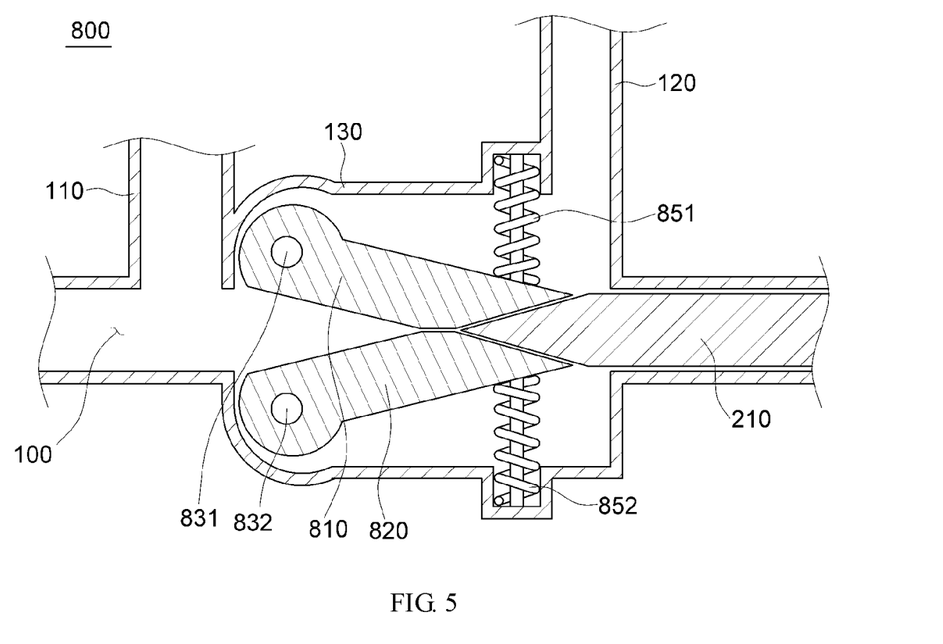
FIGS. 5 and 6 are views illustrating a process in which a flow path is opened and closed by an opening and closing unit in FIG. 4.
Figure 6:
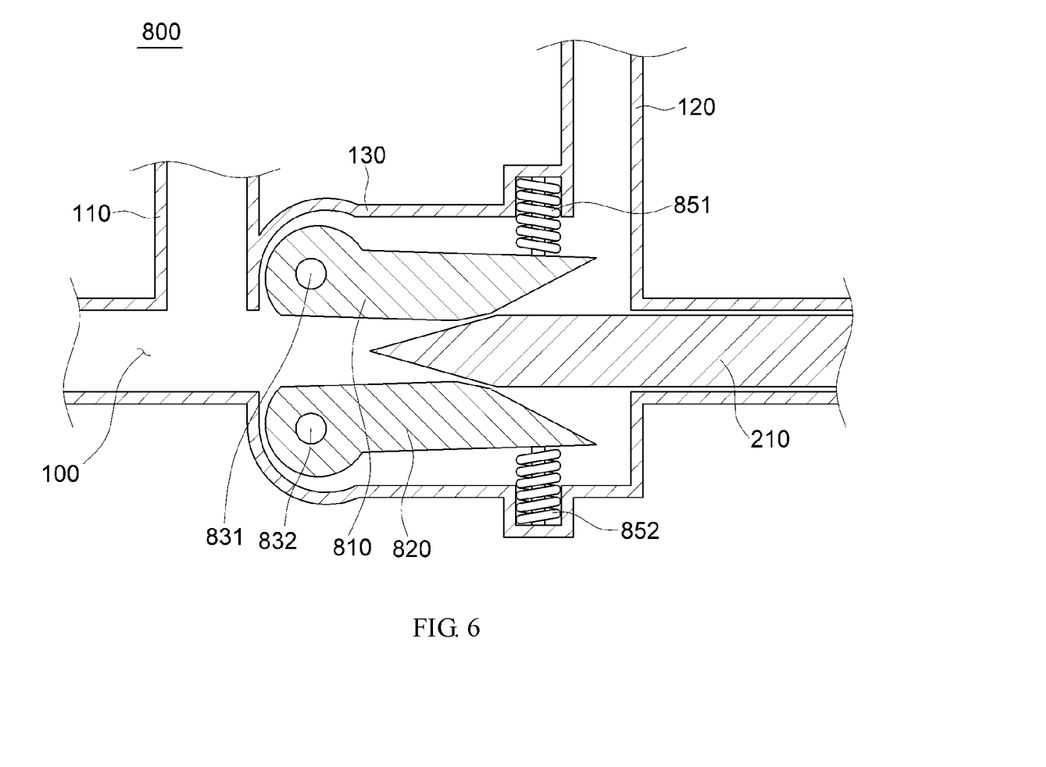

As illustrated in FIGS. 5 and 6, the motor-integrated intake apparatus 102 according to the second exemplary embodiment of the present disclosure may further include an opening and closing unit 800.

The opening and closing unit 800 may be installed between the inlet unit 110 and the discharge unit 120, and may open and close the flow path 100. Specifically, the opening and closing unit 800 may be installed in the flow path 100 between the inlet unit 110 and the discharge unit 120.

Therefore, the opening and closing unit 800 may prevent the fluid introduced into the inlet unit 110 from being discharged directly to the discharge unit 120 without moving along the flow path 100. That is, the opening and closing unit 800 may selectively divide the flow path 100.

The coil unit 900 of the motor-integrated intake apparatus 102 according to the second exemplary embodiment of the present disclosure may include a plurality of coil members 910, 920, and 930.

The coil unit 900 may include the plurality of coil members 910, 920, and 930 in order to form magnetic fields in different regions of the flow path 100. Specifically, the plurality of coil members 910, 920, and 930 may be installed in the housing 10 so as to be spaced apart from one another so that magnetic fields are formed in different regions of the flow path 100.

Therefore, the first and second pistons 220 and 230 having a magnetic material may be effectively moved along the entire region of the flow path 100 by the plurality of coil members 910, 920, and 930.

The motor-integrated intake apparatus 102 according to the second exemplary embodiment of the present disclosure may further include a hollow portion 140, and a support unit 700 that includes a first support member 710, a second support member 720, and a third support member 730.

The hollow portion 140, which is formed in the form of a through hole, may be formed at a center of the housing 10. Specifically, the housing 10 may be formed in a doughnut shape having the hollow portion 140 at a center thereof, and the annular flow path 100 may be formed in a circumferential direction of the housing 10.

The piston body 210 may be rotated while facing the inner wall of the flow path 100 adjacent to the hollow portion 140 of the housing 10. That is, the piston body 210 may be moved along the flow path 100 based on the hollow portion 140.

The support unit 700 is installed in the hollow portion 140 of the housing 10, and may be disposed to radially support the hollow portion 140. In addition, the support unit 700 may include a first support member 710, a second support member 720, and a third support member 730.

The first support member 710 may be installed in the hollow portion 140 of the housing 10. In addition, the first support member 710 may be installed to traverse the hollow portion 140 in a direction intersecting the hollow portion 140.

The second support member 720 may be installed in the hollow portion 140 of the housing 10. In addition, the second support member 720 may be installed in a direction intersecting the first support member 710.

The third support member 730 may be installed in the hollow portion 140 of the housing 10. In addition, the third support member 730 may be installed in a direction intersecting the first support member 710 and the second support member 720.

That is, the support unit 700, which includes the first support member 710, the second support member 720, and the third support member 730, is radially formed, and may be installed in the hollow portion 140. As an example, the radial support unit 700 may include the first support member 710 which is installed in the hollow portion 140 of the housing 10 and extends toward an interior of the housing 10 from a center of the housing 10, the third support member 730 which is spaced apart from the first support member 710 and extends toward the interior of the housing 10, and the second support member 720 which is spaced apart from the third support member 730 and extends toward the interior of the housing 10.

The coil unit 900 according to the second exemplary embodiment of the present disclosure may include a first coil member 910, a second coil member 920, and a third coil member 930.

The first coil member 910 may be installed on the first support member 710. Specifically, the first coil member 910 is installed to be wound around the first support member 710 and may form a magnetic field so as to rotate the first and second pistons 220 and 230 which are disposed in the flow path 100 and have a magnetic material.

The second coil member 920 may be installed on the second support member 720. Specifically, the second coil member 920 is installed to be wound around the second support member 720 and may form a magnetic field so as to rotate the first and second pistons 220 and 230 which are disposed in the flow path 100 and have a magnetic material.

The third coil member 930 may be installed on the third support member 730. Specifically, the third coil member 930 is installed to be wound around the third support member 730 and may form a magnetic field so as to rotate the first and second pistons 220 and 230 which are disposed in the flow path 100 and have a magnetic material.

Therefore, since the first coil member 910, the second coil member 920, and the third coil member 930 may be installed in the hollow portion 140 formed at a central portion of the housing 10, the motor-integrated intake apparatus 102 may efficiently utilize an installation space of the plurality of coil members 910, 920, and 930.

Since the first coil member 910, the second coil member 920, and the third coil member 930 are installed on the first support member 710, the second support member 720, and the third support member 730 which are installed in the direction intersecting the hollow portion 140, respectively, the first piston 220 and the second piston 230, which are installed to have a phase difference of 180 degrees (°) and have a magnetic material, may receive rotational power so that the first piston 220 and the second piston 230 may effectively move along the flow path 100.

The motor-integrated intake apparatus 102 according to the second exemplary embodiment of the present disclosure may further include a detecting unit 500 and a control unit 600.

The detecting unit 500 may detect position information of the first piston 220 or the second piston 230 disposed in the flow path 100.

That is, the detecting unit 500 may be installed on the housing 10 and may detect the current position of the first piston 220 or the second piston 230 in the flow path 100. Specifically, the detecting unit 500 may detect a position of the first piston 220 or the second piston 230 which is made of a magnetic material and disposed in the flow path 100.

The control unit 600 may receive position information of the first piston 220 or the second piston 230 which is detected by the detecting unit 500. In addition, based on the position information of the first piston 220 or the second piston 230 which is provided from the detecting unit 500, the control unit 600 may form a magnetic field by selectively supplying electric power to one or more coil members among the plurality of coil members 910, 920, and 930.

That is, based on the current position of the piston unit 200, the control unit 600 may selectively control a direction of a magnetic field formed in one or more coil members among the plurality of coil members 910, 920, and 930 which is required to move the first piston 220 or the second piston 230.

As an example, as illustrated in FIG. 4, the detecting unit 500 may include a first detecting member 510, a second detecting member 520, a third detecting member 530, a fourth detecting member 540, a fifth detecting member 550, and a sixth detecting member 560 which are disposed at an outer circumference of the housing 10 so as to be spaced apart from one another.

Specifically, the first detecting member 510 may be installed between one end of the first support member 710 and one end of the third support member 730 outside the housing 10.

The second detecting member 520 may be installed between one end of the third support member 730 and one end of the second support member 720 outside the housing 10.

The third detecting member 530 may be installed between one end of the second support member 720 and the other end of the first support member 710 outside the housing 10.

The fourth detecting member 540 may be installed between the other end of the first support member 710 and the other end of the third support member 730 outside the housing 10.

The fifth detecting member 550 may be installed between the other end of the third support member 730 and the other end of the second support member 720 outside the housing 10.

The sixth detecting member 560 may be installed between the other end of the second support member 720 and one end of the first support member 710 outside the housing 10.

The opening and closing unit 800 of the motor-integrated intake apparatus 102 according to the second exemplary embodiment of the present disclosure may include a plurality of opening and closing members 810 and 820 and a plurality of elastic members 851 and 852.

The plurality of opening and closing members 810 and 820 may be installed between the inlet unit 110 and the discharge unit 120 inside the housing 10. Specifically, the plurality of opening and closing members 810 and 820 may include a first opening and closing member 810 and a second opening and closing member 820. That is, the plurality of opening and closing members 810 and 820 may include a pair of opening and closing members.

The plurality of elastic members 851 and 852 may support the plurality of opening and closing members 810 and 820, respectively. Specifically, the plurality of elastic members 851 and 852 may include a first elastic member 851 and a second elastic member 852.

The first elastic member 851 is installed between an inner wall of the flow path 100 and the first opening and closing member 810, and may provide elastic force to the first opening and closing member 810.

The second elastic member 852 is installed between the second opening and closing member 820 and an inner wall of the flow path 100 which faces the inner wall of the flow path 100 on which the first elastic member 851 is installed, and the second elastic member 852 may provide elastic force to the second opening and closing member 820.

The plurality of opening and closing members 810 and 820 opens the flow path 100 by being moved in a direction away from each other by pressing force of the first piston 220 or the second piston 230, and closes the flow path 100 by elastic force of the plurality of elastic members 851 and 852 and pressure of the fluid when pressing force of the first piston 220 or the second piston 230 is eliminated.

Specifically, the opening and closing unit 800 may further include a plurality of rotation pins 831 and 832. The plurality of rotation pins 831 and 832 may support the plurality of opening and closing members 810 and 820 installed in the flow path 100, respectively, so that the opening and closing members 810 and 820 are rotatable. Specifically, the plurality of rotation pins 831 and 832 may include a first rotation pin 831 which supports the first opening and closing member 810, and a second rotation pin 832 which supports the second opening and closing member 820.

That is, one end portion of the first opening and closing member 810 may be rotatably supported by the first rotation pin 831, and the other end portion of the first opening and closing member 810 may be supported by the first elastic member 851.

Similar to the first opening and closing member 810, the second opening and closing member 820 may also be supported by the second rotation pin 832 and the second elastic member 852.

Specifically, the first rotation pin 831 and the second rotation pin 832 may be installed in the flow path 100 so as to be spaced apart from each other.

Therefore, when the first piston 220 or the second piston 230 presses the first opening and closing member 810 and the second opening and closing member 820, the first opening and closing member 810 and the second opening and closing member 820 may be moved in a direction away from each other while rotating about the plurality of rotation pins 831 and 832, respectively, thereby opening the flow path 100.

The plurality of opening and closing members 810 and 820 are spaced apart from each other at one end portion of each of the opening and closing members 810 and 820 and supported by the plurality of rotation pins 831 and 832, respectively, and the plurality of opening and closing members 810 and 820 are selectively spaced apart from each other at the other end portion of each of the opening and closing members 810 and 820 by pressing force of the first pistons 220 or the second piston 230, thereby opening the flow path 100.

Therefore, the plurality of rotation pins 831 and 832 may effectively support the rotations of the plurality of opening and closing members 810 and 820, and may guide the rotations of the plurality of opening and closing members 810 and 820 and the movements of the plurality of opening and closing members 810 and 820 in a direction in which the plurality of opening and closing members 810 and 820 move away from each other, thereby improving a lifespan of the plurality of opening and closing members 810 and 820. In addition, the plurality of rotation pins 831 and 832 may improve responsiveness of the plurality of opening and closing members 810 and 820 that may open and close the flow path 100.

The motor-integrated intake apparatus 102 according to the second exemplary embodiment of the present disclosure may further include an installation region 130.

The installation region 130 may be formed as one region of the housing 10 between the inlet unit 110 and the discharge unit 120 protrudes outward. In addition, the opening and closing unit 800 may be installed in the installation region 130. Specifically, the plurality of rotation pins 831 and 832, the plurality of elastic members 851 and 852, and the plurality of opening and closing members 810 and 820 are installed in the installation region 130, such that the flow path 100 may be opened by the plurality of opening and closing members 810 and 820 pressed by the first piston 220 or the second piston 230.

When pressing force between the first piston 220 or the second piston 230 and the plurality of opening and closing members 810 and 820 is eliminated, the fluid between the installation region 130 and an outer circumferential surface of the first opening and closing member 810 and the fluid between the installation region 130 and an outer circumferential surface of the second opening and closing member 820 may provide pressing force to the outer circumferential surfaces of the first and second opening and closing members 810 and 820, respectively, in a direction in which the first and second opening and closing members 810 and 820 close the flow path 100.

Therefore, when pressing force, which is applied to the plurality of opening and closing members 810 and 820 by the first piston 220 or the second piston 230, is eliminated, force for closing the flow path 100 may be generated by the first and second elastic members 851 and 852, pressing force of the fluid between the installation region 130 and the outer circumferential surface of the first opening and closing member 810, and pressing force of the fluid between the installation region 130 and the outer circumferential surface of the second opening and closing member 820, thereby effectively closing the flow path 100.

One end of the first piston 220 and one end of the second piston 230 have an approximately V shape (wedge shape) and protrude in the rotation directions of the first piston 220 and the second piston 230, and the other end of the first opening and closing member 810 and the other end of the second opening and closing member 820, which are pressed by initially coming into contact with one end of the first piston 220 and one end of the second piston 230, form a V groove that may be engaged with one end of the first piston 220 or one end of the second piston 230, and as a result, the first piston 220 or the second piston 230 may be effectively engaged with the first and second opening and closing members 810 and 820, thereby opening the flow path 100.

The first piston 220 or the second piston 230 may be effectively rotated in one direction in order to open the flow path 100 by the protruding shapes of one end of the first piston 220 and one end of the second piston 230 and the shapes of the first and second opening and closing members 810 and 820 that may be engaged with one end of the first piston 220 and one end of the second piston 230.

That is, when the first piston 220 or the second piston 230 moves along the flow path 100 and presses the first opening and closing member 810 and the second opening and closing member 820 which are provided as a pair, the first opening and closing member 810 and the second opening and closing member 820 may press the first elastic member 851 and the second elastic member 852 while moving in a direction away from each other.

In this case, the first piston 220 or the second piston 230 may move while pressing the plurality of opening and closing members 810 and 820 so as to open the flow path 100 closed by the plurality of opening and closing members 810 and 820.

When the first piston 220 or the second piston 230 is separated from the plurality of opening and closing members 810 and 820 including the first opening and closing member 810 and the second opening and closing member 820 as the first piston 220 or the second piston 230 moves, the first opening and closing member 810 and the second opening and closing member 820 may move in a direction close to each other by elastic force of the first elastic member 851 and the second elastic member 852, thereby closing the flow path 100.

In this case, the first opening and closing member 810 and the second opening and closing member 820 may effectively close the flow path 100 not only by elastic force of the first elastic member 851 and the second elastic member 852, but also by pressing force of the fluid between the outer circumferential surface of the first opening and closing member 810 and the installation region 130 and pressing force of the fluid between the outer circumferential surface of the second opening and closing member 820 and the installation region 130.

The opening and closing unit 800 may form one region between the opening and closing unit 800 and the first piston 220 or between the opening and closing unit 800 and the second piston 230 by dividing the flow path 100, and as a result, the first piston 220 or the second piston 230 may compress the fluid in one region while moving along the flow path 100, and may discharge the fluid through the discharge unit 120.

That is, when the first piston 220 or the second piston 230 rotates once along the flow path 100, the opening and closing unit 800 may come into contact with the first piston 220 and the second piston 230 and open the flow path 100 two times. Therefore, the compressed fluid between the first piston 220 and the opening and closing unit 800 and the compressed fluid between the second piston 230 and the opening and closing unit 800 may be discharged to the outside of the housing 10 through the discharge unit 120.

As an example, when the fluid, which is supplied through the inlet unit 110, is compressed between the first piston 220 and the opening and closing unit 800 as the first piston 220 having a magnetic material moves in a direction adjacent to the discharge unit 120, the compressed fluid is discharged to the outside of the housing 10 through the discharge unit 120.

Hereinafter, an operating process of the motor-integrated intake apparatus 102 according to the second exemplary embodiment of the present disclosure will be described with reference to FIGS. 4 to 6.

The control unit 600 detects position information of any one of the first piston 220 and the second piston 230 in the annular flow path 100 by means of the detecting unit 500. Specifically, the first piston 220 and the second piston 230 are disposed to have a phase difference of 180 degrees with each other based on the piston body 210, and as a result, if the detecting unit 500 detects only a position of any one of the first piston 220 and the second piston 230, the control unit 600 may find out a position of the remaining one of the first piston 220 and the second piston 230.

Therefore, any one of the plurality of detecting members 510, 520, 530, 540, 550, and 560 detects a position of the first piston 220 having a magnetic material, and transmits the position information of the first piston 220 to the control unit 600.

Based on the position information of the first piston 220, the control unit 600 forms a magnetic field by supplying electric power to one or more coil members among the first coil member 910, the second coil member 920, and the third coil member 930 so that the current first piston 220 having a magnetic material rotates along the flow path 100.

As an example, in a case in which a position of the first piston 220 is detected by the fifth detecting member 550, the control unit 600 may form a magnetic field, which may apply repulsive force to one end (N-pole) of the first piston 220, at the other end of the third coil member 930, and may form a magnetic field, which may apply attractive force to one end (N-pole) of the first piston 220, at the other end of the second coil member 920. In this case, a magnetic field, which may apply repulsive force to one end (S-pole) of the second piston 230, may be formed at one end of the third coil member 930, and a magnetic field, which may apply attractive force to one end (S-pole) of the second piston 230, may be formed at one end of the second coil member 920. Therefore, the first and second pistons 220 and 230 having magnetism are moved along the flow path 100 by magnetic force of the third and second coil members 930 and 920 in which the magnetic fields are formed, the first piston 220 may be moved in a direction close to the opening and closing unit 800, and the second piston 230 may be moved in a direction away from the opening and closing unit 800.

The fluid, which is introduced into the flow path 100 between one end portion of the first piston 220 and the opening and closing unit 800 through the inlet unit 110, may be compressed as the first piston 220 is moved by rotational power provided from the coil unit 900 in a direction adjacent to the discharge unit 120. In this case, the fluid between the first piston 220 and the opening and closing unit 800 may be compressed. Further, the compressed fluid may be discharged to the outside of the housing 10 through the discharge unit 120.

The wedge-shaped one end portion of the first piston 220 comes into contact with the other end portion of the first opening and closing member 810 and the other end portion of the second opening and closing member 820. When one end portion of the first piston 220 presses the other end portion of the first opening and closing member 810 and the other end portion of the second opening and closing member 820, the other end portion of the first opening and closing member 810 and the other end portion of the second opening and closing member 820 compress the first elastic member 851 and the second elastic member 852, respectively, while being moved in a direction away from each other. In addition, one end portion of the first opening and closing member 810 rotates about the first rotation pin 831, and one end portion of the second opening and closing member 820 rotates about the second rotation pin 832.

Therefore, when the first piston 220 comes into contact with the opening and closing unit 800, the flow path 100 may be opened.

When the first piston 220 is separated from the first opening and closing member 810 and the second opening and closing member 820, the flow path 100 may be closed by the opening and closing unit 800. In this case, the first opening and closing member 810 and the second opening and closing member 820 are moved about the first rotation pin 831 and the second rotation pin 832 in a direction in which the other end portion of the first opening and closing member 810 and the other end portion of the second opening and closing member 820 are moved in a direction close to each other, thereby closing the flow path 100.

In this case, the first opening and closing member 810 and the second opening and closing member 820 may effectively close the flow path 100 not only by restoring force of the first elastic member 851 and the second elastic member 852, but also by pressure of the fluid between the outer circumferential surfaces of the first opening and closing member 810 and the second opening and closing member 820 and the inner circumferential surface of the installation region 130.

The second piston 230 rotates along the flow path 100 while maintaining a predetermined distance from the first piston 220, thereby compressing the fluid introduced between one end portion of the second piston 230 and the opening and closing unit 800 through the inlet unit 110.

With the aforementioned configuration, the motor-integrated intake apparatus 102 according to the second exemplary embodiment of the present disclosure may effectively compress the fluid by magnetic force of the coil unit 900 that forms a magnetic field with the piston unit 200 having a magnetic material. Specifically, the piston unit 200 may compactly compress the fluid, which is introduced through the inlet unit 110, by the coil unit 900 installed in the hollow portion 140 of the housing 10. That is, the motor-integrated intake apparatus 102 may be manufactured to be portable without requiring a separate driving power generation apparatus such as a motor for moving the piston unit 200.

As an example, the motor-integrated intake apparatus 102 according to the second exemplary embodiment of the present disclosure may effectively draw a fluid when being applied to an apparatus to be conveyed such as a cleaner, and as a result, it is possible to effectively supply electric power to the coil unit 900 through an electric power supply unit without a separate driving device such as a motor.

While the exemplary embodiments of the present disclosure have been described with reference to the accompanying drawings, those skilled in the art will understand that the present disclosure may be implemented in any other specific form without changing the technical spirit or an essential feature thereof.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A motor-integrated intake apparatus comprising:
    a flow path which is formed in an annular shape in a circular housing;
    an inlet unit which is installed at one side of the housing and guides a flow of a fluid into the flow path;
    a discharge unit which is installed at the other side of the housing and guides a discharge of the fluid which is introduced into the inlet unit and passes through the flow path;
    a piston unit which is made of a magnetic material and compresses the fluid, which is introduced through the inlet unit, while rotating along the flow path, wherein the piston unit includes:
        a piston body which is supported to be rotatable along the flow path and has a plurality of magnetic members;
        a first piston which is made of a magnetic material and installed on the piston body so as to move along the flow path; and
        a second piston which is made of a magnetic material and moves along the flow path while having a phase difference of 180 degrees)(°) with the first piston; and
    a coil unit which is installed on the housing and provides rotational power to the piston unit by forming a magnetic field.

2. The motor-integrated intake apparatus of claim 1, further comprising:
    an opening and closing unit which is installed in the housing between the inlet unit and the discharge unit and selectively opens and closes the flow path by being pressed by the piston unit.

3. The motor-integrated intake apparatus of claim 2, wherein one end portion of the piston unit, which presses the opening and closing unit, is formed in a wedge shape.

4. The motor-integrated intake apparatus of claim 1, wherein an opening and closing unit selectively opens and closes the flow path by being pressed by the first piston or the second piston.

5. The motor-integrated intake apparatus of claim 4, wherein the opening and closing unit includes:
    a plurality of opening and closing members which are installed in the housing between the inlet unit and the discharge unit; and
    a plurality of elastic members which are installed between the plurality of opening and closing members and a wall portion of the housing which surrounds a part of the flow path, and supports the plurality of opening and closing members, respectively.

6. The motor-integrated intake apparatus of claim 4, wherein the housing further includes an installation region which is formed as one region between the inlet unit and the discharge unit, the installation region protrudes outward, and the opening and closing unit is installed in the installation region.

7. The motor-integrated intake apparatus of claim 1, wherein the coil unit includes a plurality of coil members which are installed to form a magnetic field in different regions of the flow path.

8. The motor-integrated intake apparatus of claim 7, further comprising a detecting unit which detects a position of the first piston or the second piston.

9. The motor-integrated intake apparatus of claim 1, further comprising:
    a hollow portion which is formed at a central portion of the housing; and
    a radial support unit which includes a first support member which is installed in the hollow portion, a second support member which is installed in the hollow portion intersecting the first support member, and a third support member which is installed in the hollow portion intersecting the first support member and the second support member.

10. The motor-integrated intake apparatus of claim 9, wherein the plurality of coil members includes:
    a first coil member which is installed on the first support member;
    a second coil member which is installed on the second support member; and
    a third coil member which is installed on the third support member.

* * * * *